United States Patent [19]
Uchimura

[11] Patent Number: 6,029,227
[45] Date of Patent: Feb. 22, 2000

[54] DISK CONTROL APPARATUS TO PERFORM PARALLEL DATA TRANSFER FROM A PLURALITY OF DISK DEVICES

[75] Inventor: Toshiro Uchimura, Yokohama, Japan

[73] Assignee: Fujitsu Limited, Kawasaki, Japan

[21] Appl. No.: 08/932,360

[22] Filed: Sep. 17, 1997

[30] Foreign Application Priority Data

Feb. 19, 1997 [JP] Japan .................................. 9-034959

[51] Int. Cl.$^7$ .................................................. G06F 13/16
[52] U.S. Cl. ........................... 711/114; 711/113; 710/17; 710/18; 710/19; 710/52; 710/57; 710/60
[58] Field of Search ................................... 711/114, 113; 710/17, 18, 19, 52, 57, 60

[56] References Cited

U.S. PATENT DOCUMENTS

| | | | |
|---|---|---|---|
| 4,467,421 | 8/1984 | White ........................................ | 711/118 |
| 4,864,532 | 9/1989 | Reeve ........................................ | 710/53 |
| 5,218,689 | 6/1993 | Hotle ........................................ | 711/114 |
| 5,526,507 | 6/1996 | Hill ........................................... | 711/114 |
| 5,537,566 | 7/1996 | Konno et al. ............................. | 711/114 |
| 5,539,915 | 7/1996 | Burton et al. ............................ | 711/118 |
| 5,613,066 | 3/1997 | Matsushima et al. .................... | 714/49 |

FOREIGN PATENT DOCUMENTS

| | | |
|---|---|---|
| 3-57057 | 3/1991 | Japan . |
| 7-104947 | 4/1995 | Japan . |

*Primary Examiner*—Reginald G. Bragdon
*Attorney, Agent, or Firm*—Staas & Halsey

[57] ABSTRACT

Disclosed is a disk control apparatus having a device adapter connected to an internal bus. This device adapter includes an interface circuit for transferring data to the internal bus, a data transfer circuit for forming a plurality of data transfer paths through which a plurality of disk devices transfer data in parallel, and a buffer memory having buffer areas respectively provided for the data transfer paths. After instructing access to a disk device, a control circuit instructs data transfer to an associated buffer area, and instructs transfer of data in the buffer memory to the internal bus when the amount of data in the buffer area reaches a predetermined amount. This permits parallel data transfer from a plurality of disk devices.

16 Claims, 12 Drawing Sheets

DISK CONTROL APPARATUS TO PERFORM PARALLEL DATA TRANSFER FROM A PLURALITY OF DISK DEVICES

BACKGROUND OF THE INVENTION

1. Field of the Invention

The present invention relates to a disk control apparatus having a device adapter circuit connected to an internal bus, and, more particularly, to a disk control apparatus capable of accomplishing parallel data transfer from a plurality of disk devices.

2. Description of the Related Art

Disk storage systems like a magnetic disk system are employed as an external memory device in a computer system. A disk storage system has a plurality of magnetic disk devices and a disk control apparatus which controls those disk devices. The disk control apparatus accesses a designated magnetic disk device in response to an access request from a high-rank apparatus.

When the magnetic disk device is ready to be accessed, it gives a notice to the disk control apparatus. Then, the magnetic disk device starts transferring data to the disk control apparatus. The disk control apparatus transfers that data to the high-rank apparatus. Efficient control of data transfer is demanded of such a disk control apparatus.

FIG. 10 is a block diagram of a prior art disk control apparatus.

As shown in FIG. 10, a disk control apparatus 80 is connected to a plurality of magnetic disk devices 90-1 to 90-4. The disk control apparatus 80 comprises a channel adapter circuit 81, a resource manager circuit 82, a table storage 83, a main storage 84, a device adapter circuit 85 and an internal bus 86.

The channel adapter circuit 81 controls interface with a high-rank apparatus. The resource manager circuit 82 manages resources. The table storage 83 stores various kinds of tables for the resource management by the resource manager circuit 82.

The main storage 84 temporarily stores read data from a magnetic disk device. The device adapter circuit 85 accesses any designated one of the magnetic disk devices 90-1 to 90-4 and transfers data to the main storage 84.

The operation of this disk control apparatus 80 will be described below. When receiving an access request from a high-rank apparatus, the channel adapter circuit 81 notifies that access request to the resource manager circuit 82. The resource manager circuit 82 assigns an area in the main storage 84, then requests the device adapter circuit 85 to access the designated one of the magnetic disk devices 90-1 to 90-4.

The device adapter circuit 85 accesses the designated magnetic disk device 90-1, 90-2, 90-3 or 90-4. When the designated magnetic disk device 90-1, 90-2, 90-3 or 90-4 becomes ready to transfer data, it gives a notice to that effect to the device adapter circuit 85. Then, that magnetic disk device 90-1, 90-2, 90-3 or 90-4 transfers data to the device adapter circuit 85.

After getting a permission to use the internal bus 86, the device adapter circuit 85 transfers the data to the main storage 84. When receiving a notice of the end of data transfer from the device adapter circuit 85, the resource manager circuit 82 instructs the channel adapter circuit 81 to start data transfer. After acquiring the permission to use the internal bus 86, the channel adapter circuit 81 reads data from the main storage 84. Then, the channel adapter circuit 81 transfers the data to the high-rank apparatus.

FIG. 11 is a structural diagram of the prior art device adapter circuit, and FIG. 12 is an explanatory diagram of the prior art. FIG. 11 shows the internal structure of the device adapter circuit 85.

As shown in FIG. 11, the device adapter circuit 85 has a bus interface circuit 87, an automatic transfer circuit 88 and a data transfer circuit 89.

The bus interface circuit (BIL) 87, connected to the internal bus 86, performs interface control on the internal bus 86. The automatic transfer circuit (ADT) 88 accesses the magnetic disk devices 90-1 to 90-4 via the data transfer circuit (SCSI) 89 in accordance with an access request from the interface circuit 87.

When any of the magnetic disk devices 90-1 to 90-4 becomes ready for data transfer, it notifies such to the automatic transfer circuit 88. The automatic transfer circuit 88 instructs the interface circuit 87 to get the permission to use the internal bus 86. The automatic transfer circuit 88 receives data from that one of the magnetic disk devices 90-1 to 90-4, then transfers it to the interface circuit 87. The interface circuit 87 transfers that data to the internal bus 86.

As shown in FIG. 12, the magnetic disk devices 90-1 to 90-4 transfer data in accordance with the transfer rate of each magnetic disk device. The interface circuit 87 transfers data to the internal bus in accordance with that transfer rate. The conventional device adapter 85 therefore starts the data transfer of one magnetic disk device after completing the data transfer of a previous magnetic disk device.

The transfer rate of each magnetic disk device however depends on the data reading speed of that magnetic disk device. Generally speaking, magnetic disk devices have a relatively low transfer rate. By contrast, the transfer rate of the internal bus is relatively fast because only electric control is involved. Actually, the transfer rate of the internal bus is more than two times faster than that of magnetic disk devices.

According to the conventional structure, the transfer rate of the internal bus is designed to match the transfer rate of magnetic disk devices. The prior art could not therefore effectively use the transfer rate of the internal bus.

SUMMARY OF THE INVENTION

Accordingly, it is the primary objective of the present invention to provide a disk control apparatus which effectively uses the transfer rate of the internal bus.

It is another objective of this invention to provide a disk control apparatus which allows a plurality of disk devices to execute parallel data transfer.

It is a further objective of this invention to provide a disk control apparatus which improves the data transfer speed.

A disk control apparatus according to this invention, to which a plurality of disk devices are connected, accesses a designated disk device in accordance with a request from a high-rank apparatus and transfers data from the disk device to the high-rank apparatus.

The disk control apparatus comprises a channel adapter circuit for controlling interface with the high-rank apparatus and transferring data to the high-rank apparatus, a memory for storing the data, a device adapter circuit for accessing the designated disk device and transferring data from the disk device to the memory, a resource manager circuit or instructing the device adapter circuit to access the disk device in accordance with a request from the channel adapter circuit, and an internal bus for connecting the channel adapter circuit, the memory, the device adapter circuit and the resource manager circuit.

The device adapter circuit includes an interface circuit, connected to the internal bus, for transferring data to the internal bus, a data transfer circuit for forming a plurality of data transfer paths through which the plurality of disk devices transfer data in parallel, a buffer memory having buffer areas respectively provided for the data transfer paths, and a control circuit for instructing access to the designated disk device, then instructing the data transfer circuit to transfer data from the designated disk device to an associated buffer area in accordance with an interrupt request from the disk device, and instructing the interface circuit to transfer data from the buffer area when an amount of data in the buffer area reaches a predetermined amount.

It is preferable that the data transfer circuit include a plurality of first transfer circuits for exchanging data with the disk devices at a first transfer rate, a second transfer circuit for storing data from the designated disk device into an associated buffer area, and a data transfer bus for connecting the plurality of first transfer circuits to the second transfer circuit and transferring data at a second transfer rate faster than the first transfer rate.

This invention is provided with the data transfer circuit for forming a plurality of data transfer paths through which a plurality of disk devices transfer data in parallel. Even when a plurality of disk devices operate in parallel, therefore, data can be transferred. For example, the data transfer bus transferring data at the second transfer rate faster than the transfer rate of the disk devices connects a plurality of first transfer circuits to the second transfer circuit. Even when a plurality of disk devices operate in parallel, therefore, the fast data transfer bus is used in a time-divisional manner to permit data transfer to the second transfer circuit.

The internal bus is used by the channel adapter circuit and the resource manager circuit as well as the device adapter circuit. To use the internal bus, therefore, it is necessary to obtain a bus using permission. This prevents data from any disk device to be sent directly to the internal bus. Since the time from access to a disk device to data transfer from that disk device is not constant, the bus using permission cannot be obtained in advance.

In view of the above, a buffer memory having buffer areas provided for the respective transfer paths is provided so that data from each transfer path is stored in the associated buffer area. When the amount of data in a buffer area of interest reaches a predetermined amount, the interface circuit transfers data from that buffer area.

With this design, transfer operations of a plurality of disk devices are simply data transfers into the associated buffer areas, the transfer operations of a plurality of disk devices can be executed independently of operations of transferring data to the internal bus. As data transfer to the internal bus is performed when the amount of data in a buffer area of interest reaches a predetermined amount, operations of transferring data to the internal bus can be executed independently of the transfer operations of a plurality of disk devices. Even when a plurality of disk devices operate in parallel, therefore, data from the disk devices can be transferred in the proper order to the internal bus.

Accordingly, the fast transfer rate of the internal bus does not depend on the transfer rate of the disk devices and can thus be effectively used. This can allow the parallel operations of the disk devices.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DETAILED DESCRIPTION OF THE PREFERRED EMBODIMENTS

Figure 1:
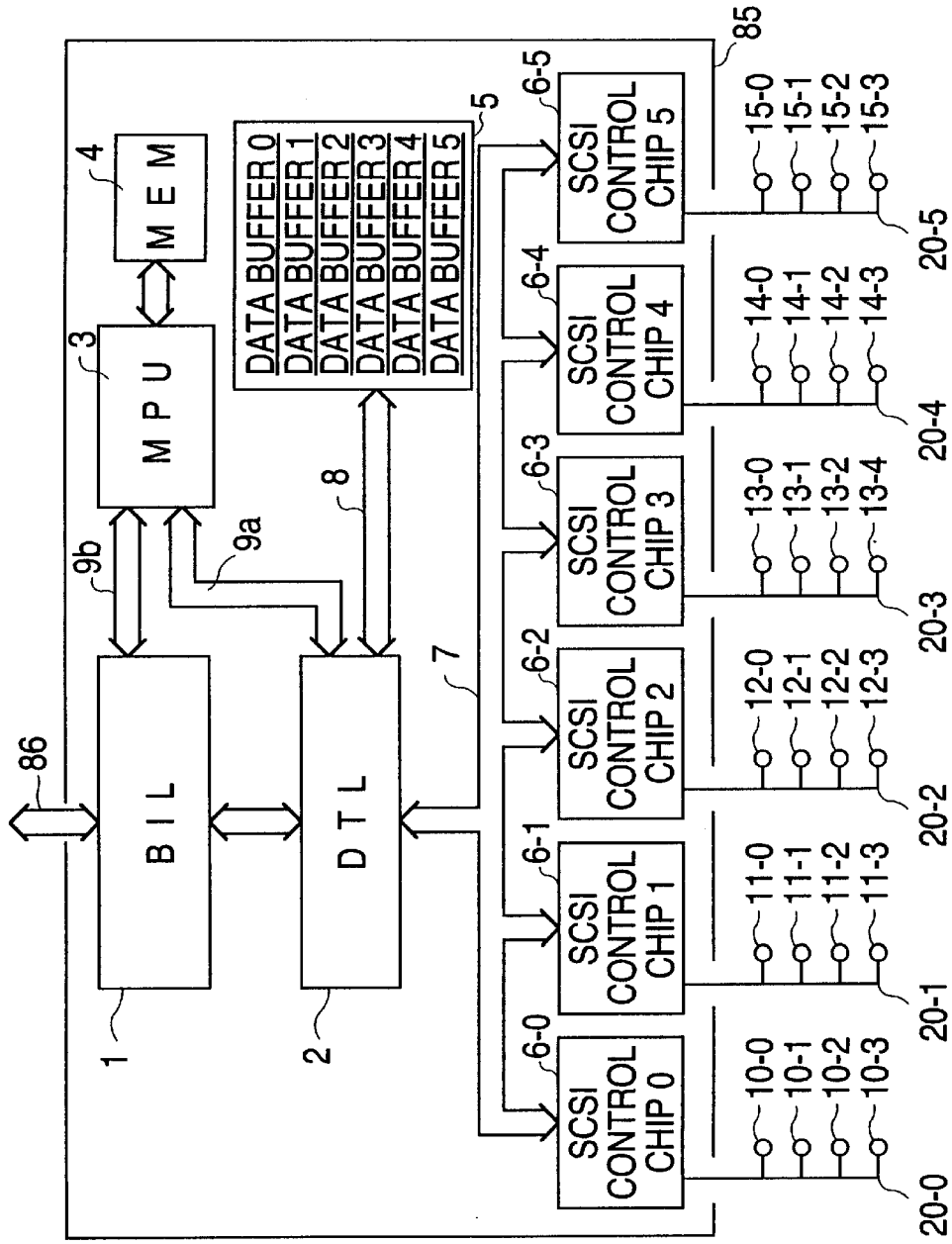
FIG. 1 is a block diagram of one embodiment of this invention.
Figure 2:
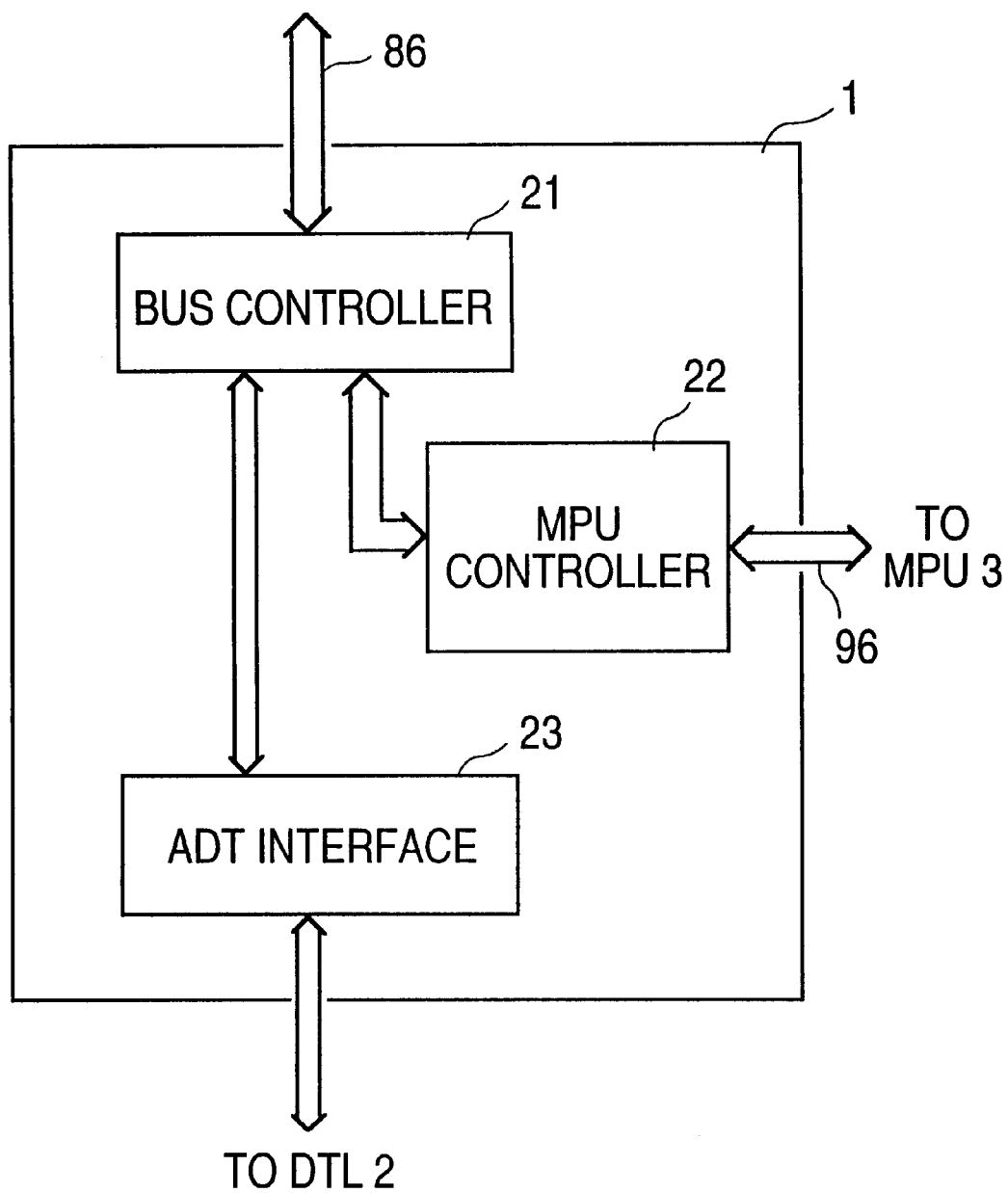
FIG. 2 is a block diagram of a bus interface circuit according to the embodiment in FIG. 1.
Figure 3:
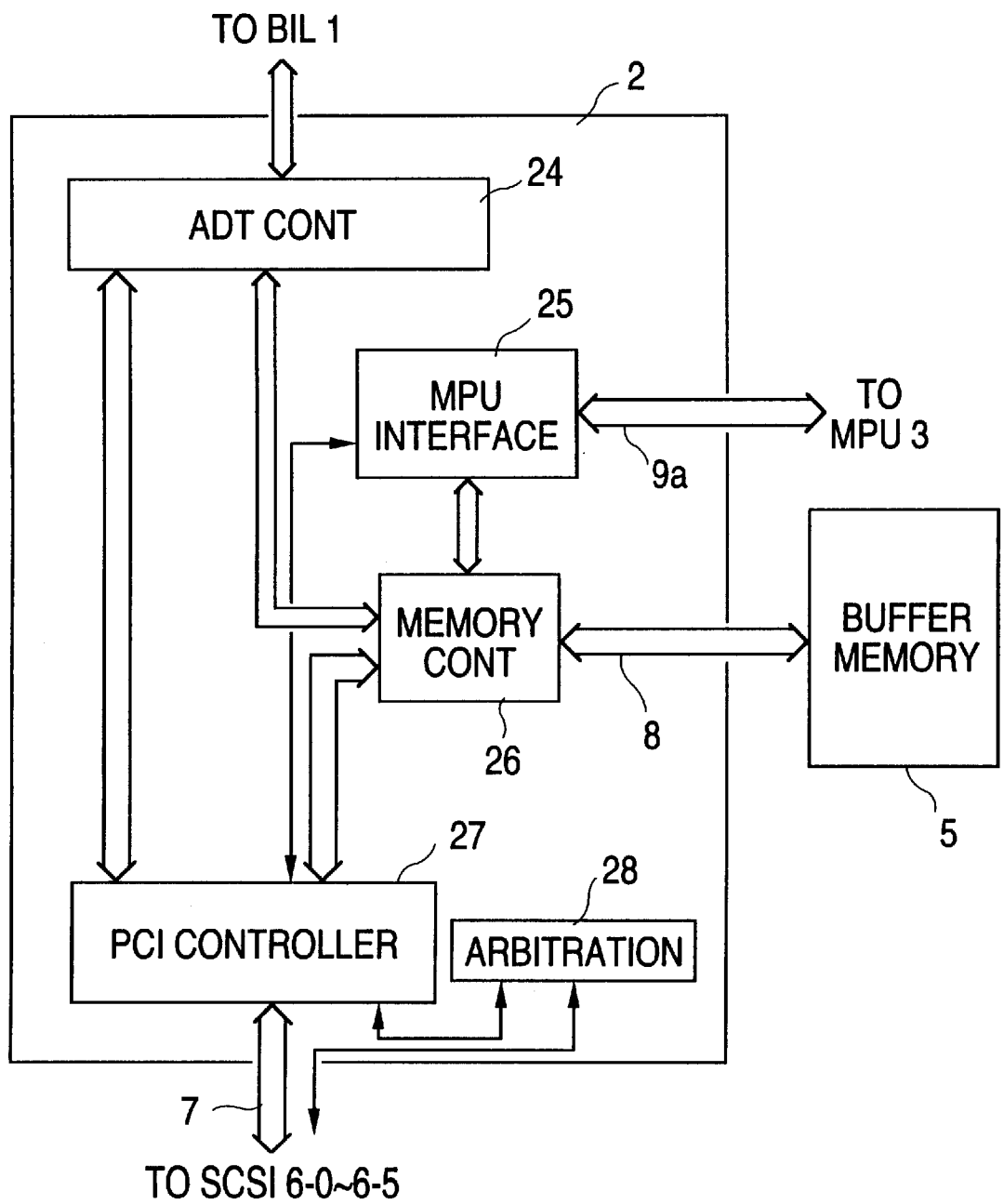
FIG. 3 is a block diagram of a data transfer logic circuit according to the embodiment in FIG. 1.
Figure 4:
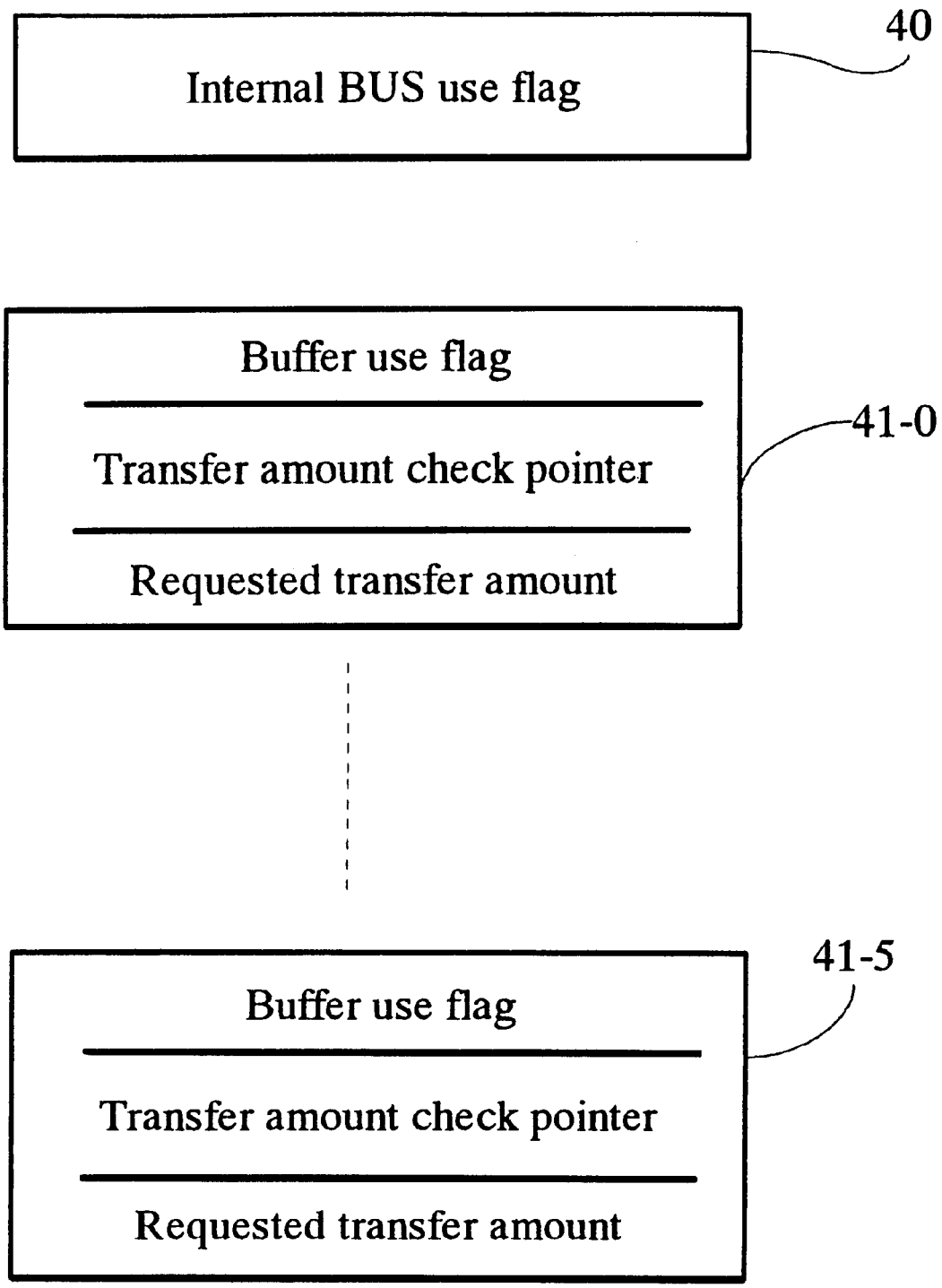
FIG. 4 is an explanatory diagram of a memory according to the embodiment in FIG. 1.

FIG. 1 is a block diagram of one embodiment of this invention, FIG. 2 is a block diagram of a bus interface circuit in FIG. 1, FIG. 3 is a block diagram of a data transfer logic in FIG. 1, and FIG. 4 is a structural diagram of a table in FIG. 2.

Figure 10:
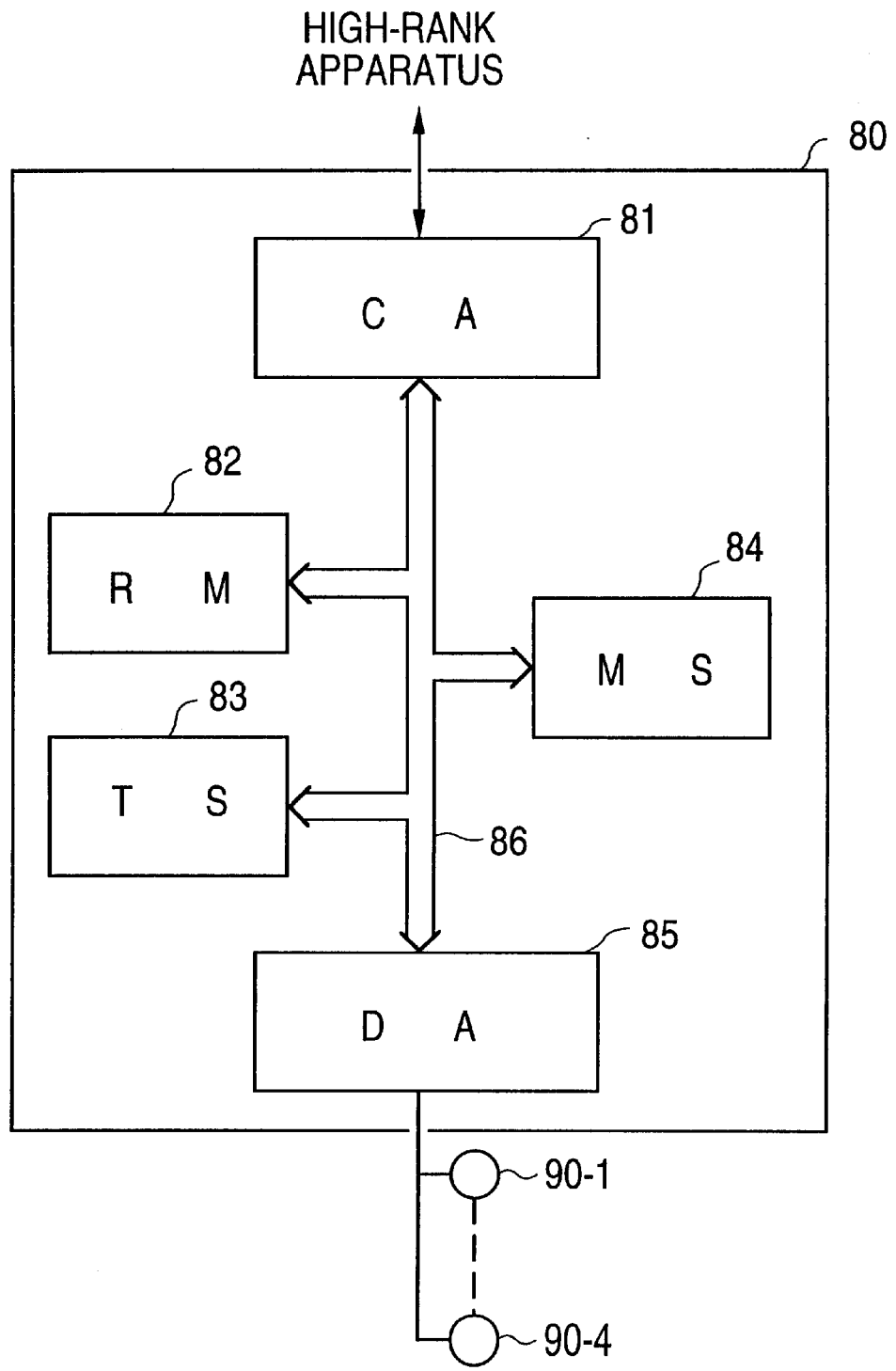
FIG. 10 is a block diagram of prior art.
Figure 11:
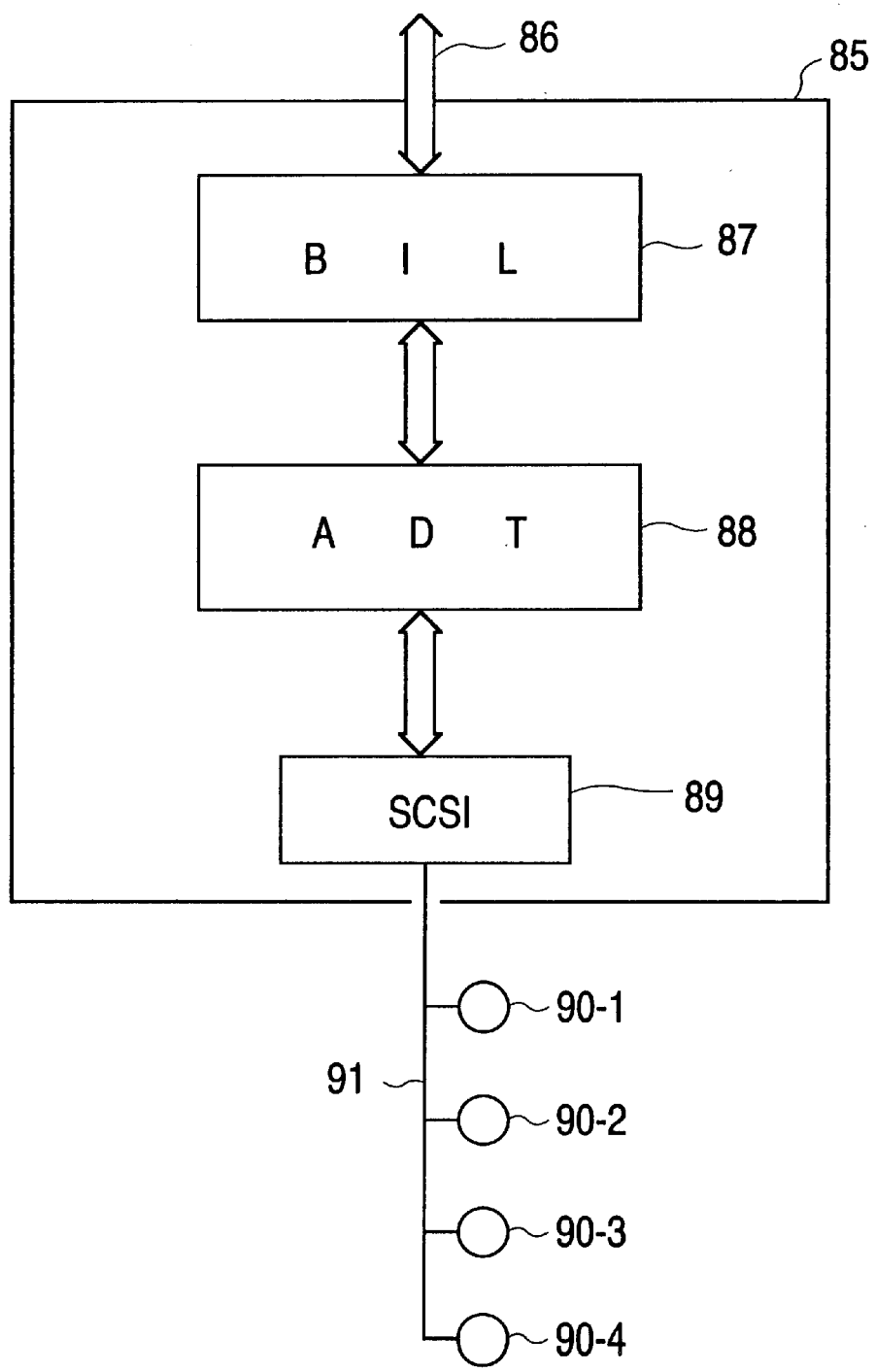
FIG. 11 is a structural diagram of the prior art.
Figure 12:
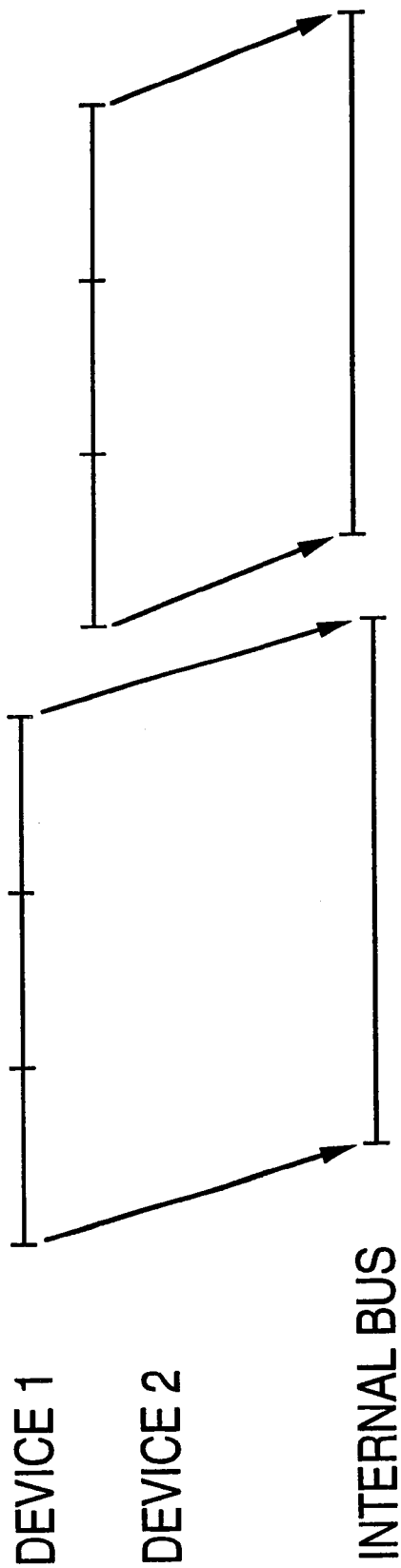
FIG. 12 is an explanatory diagram of the prior art.

FIG. 1 merely shows the structure of a device adapter circuit 85. Because the structure of the disk control apparatus is the same as the one shown in FIG. 10, it will not be illustrated.

A bus interface circuit (BIL) 1, connected to an internal bus 86, controls interface with the internal bus 86. Upon reception of an access request from the internal bus 86, the bus interface circuit 1 notifies such to a processor (MPU) 3. When receiving a transfer instruction from the processor 3, the bus interface circuit 1 gets a permission to use the internal bus 86 and transfers data in a buffer memory 5 to the internal bus 86.

As shown in FIG. 2, the bus interface circuit 1 has a bus controller 21, an MPU controller 22 and an ADT interface circuit 23. The bus controller 21, connected to the internal bus 86, controls interface with the internal bus 86. The bus controller 21, when set in a data transfer mode, obtains a permission to use the internal bus 86 and transfers a specified amount of data.

The MPU controller 22 is connected via an MPU bus 9b to the processor (MPU) 3. The MPU controller 22 exchanges commands/data with the processor 3. The ADT interface circuit 23 controls interface with the automatic transfer circuit (ADT) of a data transfer circuit (DTL) 2 which will be discussed later.

As shown in FIG. 1, the data transfer circuit (second transfer circuit) 2 selects a disk device in accordance with a selection instruction from the processor 3. The data transfer circuit (DTL) 2 stores data from the selected disk device into a buffer memory 5 in response to a transfer enable instruction from the processor 3. Then, the data transfer circuit 2 transfers data in the buffer memory 5 to the bus interface circuit 1 in response to a transfer request from the bus interface circuit 1.

As shown in FIG. 3, the data transfer circuit (DTL) 2 includes an automatic transfer circuit (ADT CONT) 24, an MPU interface circuit 25, a memory controller 26, a PCI (Peripheral Component Interconnect) controller (PCI CONT) 27, and a bus use permission controller 28.

The automatic transfer circuit 24 automatically transfers data in a designated buffer area in the buffer memory 5 in response to a request from the bus interface circuit 1. The MPU interface circuit 25, connected via an MPU bus 9a to the processor 3, controls interface with the processor 3.

The memory controller 26, connected by a memory bus 8 to the buffer memory 5, executes the read/write control of the buffer memory 5. The PCI controller 27 is connected to a PCI bus 7. In response to a transfer enable instruction from the processor 3, the PCI controller 27 activates the associated one of SCSI (Small Computer System Interface) controllers 6-0 to 6-5 via the PCI bus 7.

For the details of the PCI bus 7, please see "PCI LOCAL BUS SPECIFICATION REVISION 21" (issued on Jun. 1, 1995) published by the PCI Special Interest Group.

The PCI controller 27 stores data from any of the SCSI controllers 6-0 to 6-5 via the PCI bus 7 into the buffer area in the buffer memory 5 which is associated with that SCSI controller or the sender. The bus use permission controller 28 controls the permission for using the PCI bus 7.

As shown in FIG. 1, the individual SCSI controllers (first transfer circuits) 6-0 to 6-5 connect respective magnetic disk devices 10-0 to 15-3 by SCSI buses 20-0 to 20-5. Specifically, each of the SCSI controllers 6-0 to 6-5 connects four of the magnetic disk devices 10-0 to 15-3.

The SCSI controllers 6-0 to 6-5 exchange data with the magnetic disk devices 10-0 to 15-3 by a SCSI protocol. In accordance with an activation instruction, each of the SCSI controllers 6-0 to 6-5 activates the designated one of the magnetic disk devices 10-0 to 15-3.

When the magnetic disk devices 10-0 to 15-3 become ready to transfer data, they give notices to the respective SCSI controllers 6-0 to 6-5 and start transferring data. The SCSI controllers 6-0 to 6-5, in turn, give notices to the PCI controller 27 via the PCI bus 7. The PCI controller 27 sends an interrupt to the processor 3.

The transfer rate of the SCSI buses 20-0 to 20-5, which depends on the operation speed of the magnetic disk devices 10-0 to 15-3, is about 20 MHz. The transfer rate of the internal bus 86 is about 40 MHz, twice the transfer rate of the SCSI buses.

The PCI bus 7 connects the data transfer circuit 2 to the six SCSI controllers 6-0 to 6-5. Accordingly, six transfer paths are formed. This PCI bus 7 is a fast bus whose transfer rate is approximately 133 MHz. This data transfer circuit 2 and the six SCSI controllers 6-0 to 6-5 use the PCI bus 7 in a time-divisional fashion.

The buffer memory 5 has six buffer areas "0" to "5" in accordance with the six transfer paths (SCSI controllers). Data on each transfer path is stored in the buffer area associated with that transfer path.

The processor (control circuit) 3 comprises of a microprocessor. The processor 3 is connected to the bus interface circuit 1 and the data transfer circuit 2 via the MPU buses 9a and 9b.

When an interrupt from the bus interface circuit 1 occurs, the processor 3 analyzes data in the internal bus 86 and instructs the data transfer circuit 2 to select the designated magnetic disk device. When an interrupt from the data transfer circuit occurs, the processor 3 instructs the associated SCSI controller to initiate data transfer via the data transfer circuit 2.

A memory 4 stores data necessary for the processes to be executed by the processor 3. As shown in FIG. 4, an internal bus use flag 40 and six data transfer control tables 41-0 to 41-5 are provided in the memory 4.

The internal bus use flag 40 indicates whether or not the internal bus 86 is in use. The six data transfer control tables 41-0 to 41-5 indicate the respective statuses of the six transfer paths and the six buffer areas. Each of the data transfer control tables 41-0 to 41-5 stores a buffer use flag indicating if the associated buffer area is in use, a transfer amount check pointer indicating the amount of data accumulation at which data transfer to the internal bus 86 will start, and the number of a requested transfer number indicative of the number of transfers requested of the associated transfer path.

Figure 5:
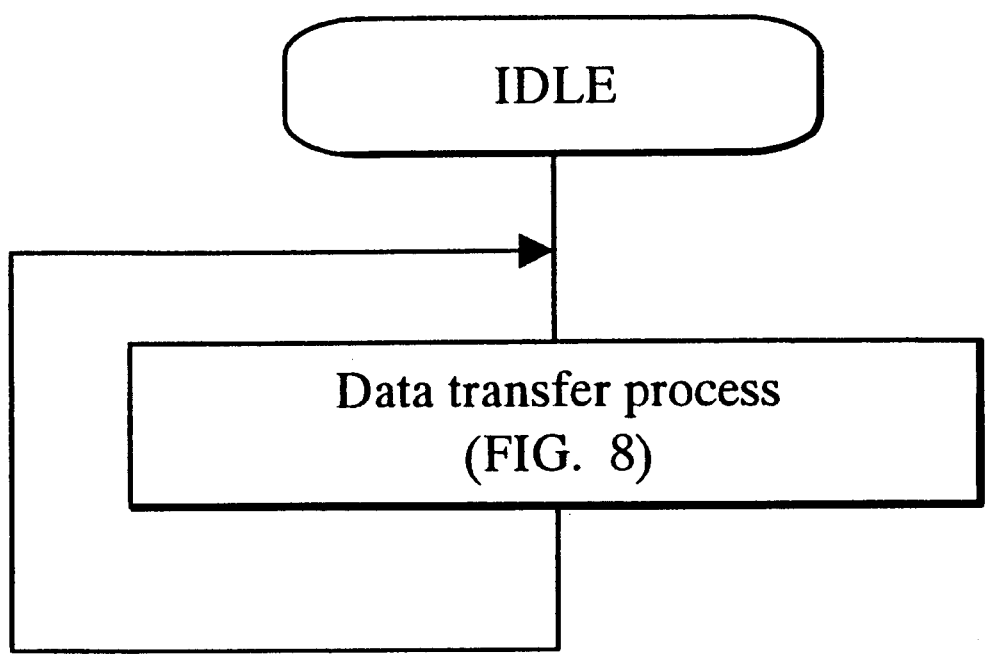
FIG. 5 is a flowchart illustrating a main process according to the embodiment in FIG. 1.
Figure 6:
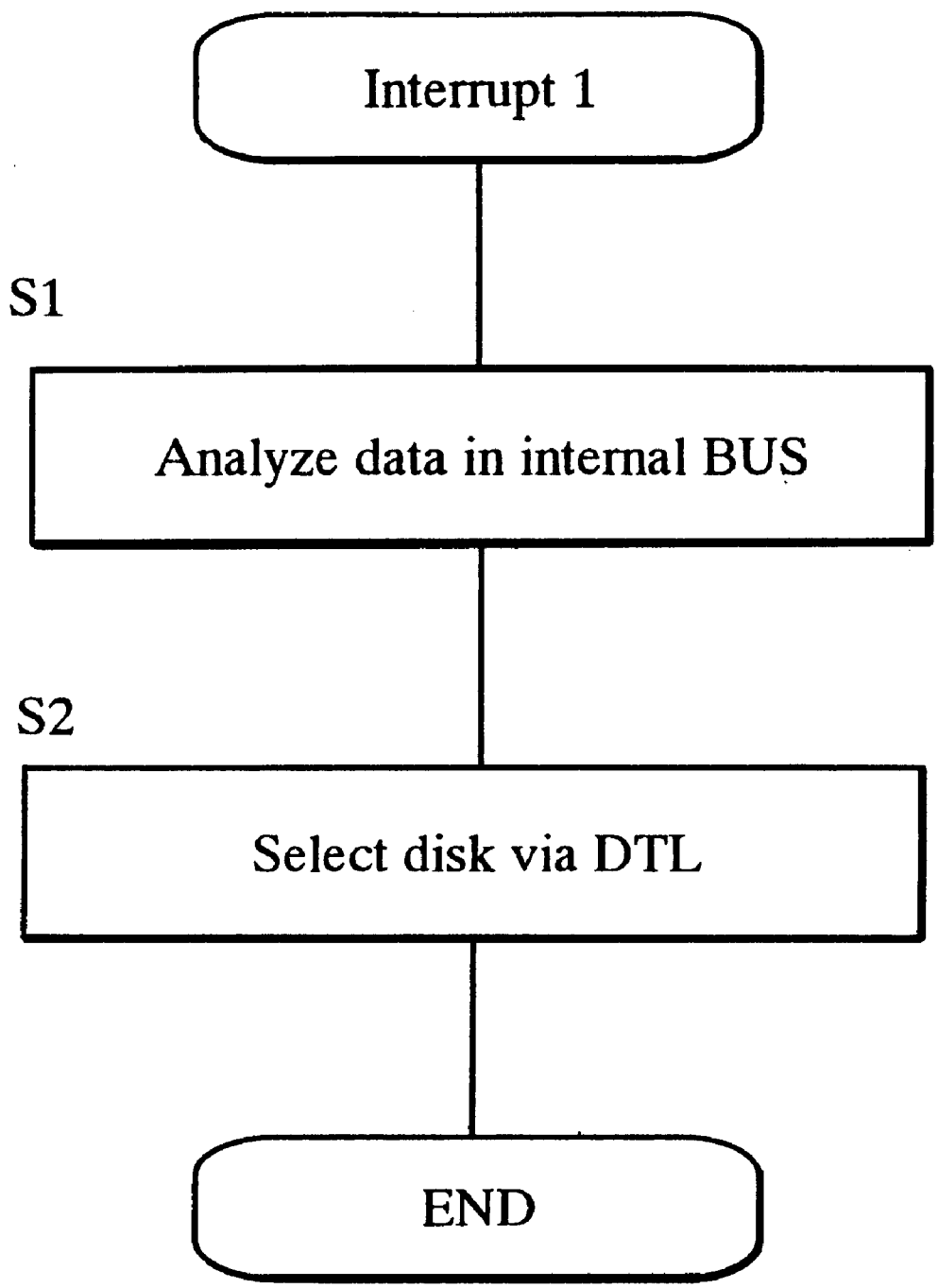
FIG. 6 is a flowchart illustrating a process for interruption from a BIL according to the embodiment in FIG. 5.
Figure 7:
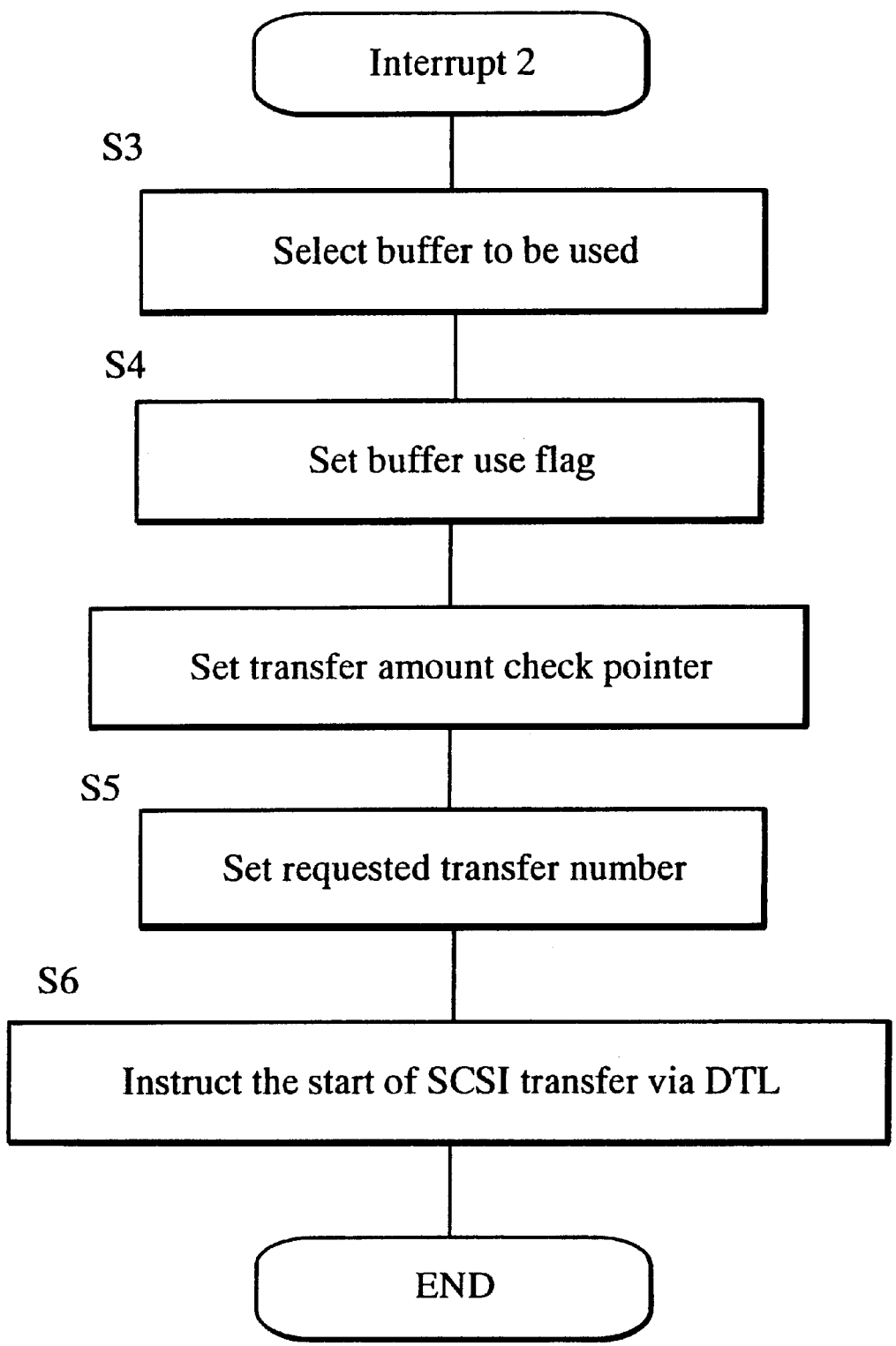
FIG. 7 is a flowchart illustrating a process for interruption from a DTL according to the embodiment in FIG. 1.
Figure 8:
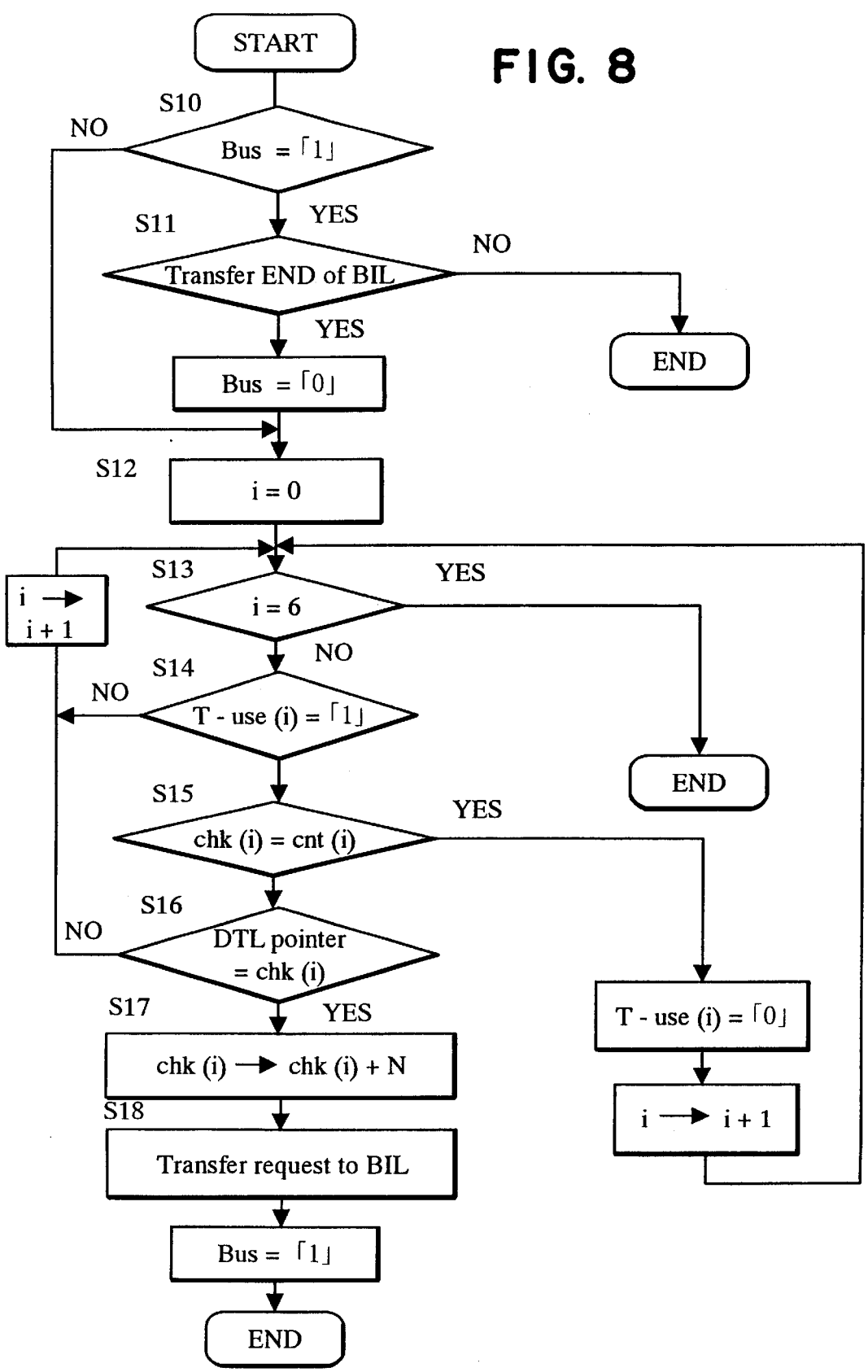
FIG. 8 is a flowchart for a data transfer process according to the embodiment in FIG. 5.
Figure 9:
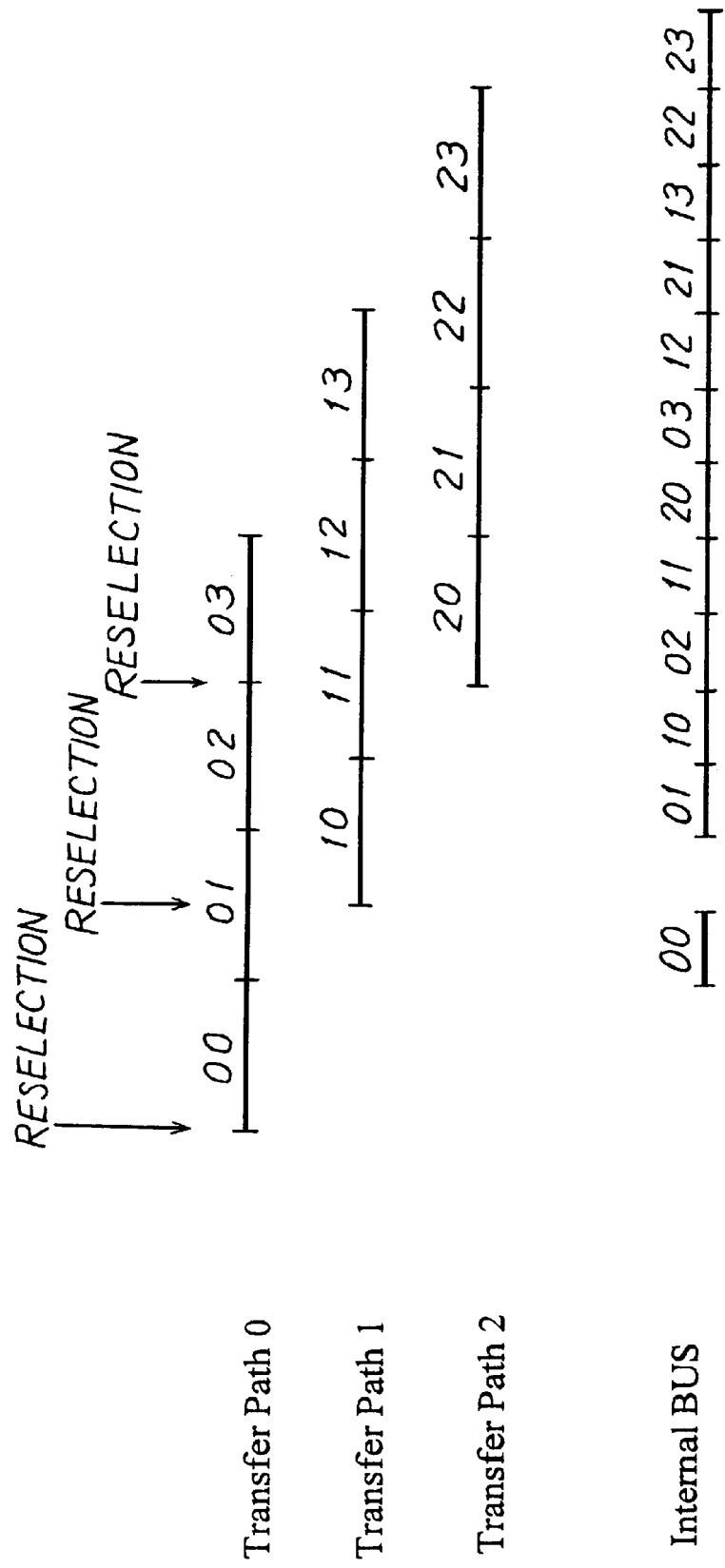
FIG. 9 is an explanatory diagram of the operation of this embodiment of the invention.

FIG. 5 is a flowchart illustrating a main process which the processor 3 executes, FIG. 6 is a flowchart illustrating a process for interruption from the bus interface circuit (BIL), which is executed by the processor 3, FIG. 7 is a flowchart illustrating a process for interruption from the data transfer circuit 2 (DTL), which is executed by the processor 3, FIG. 8 is a flowchart for a data transfer process in FIG. 5, and FIG. 9 is an explanatory diagram of the operation of this embodiment of the invention.

As shown in FIG. 5, the processor 3 executes the data transfer process illustrated in FIG. 8. When there is an interrupt from the bus interface circuit (BIL), the processor 3 executes the interruption process in FIG. 6. When there is an interrupt from the data transfer circuit 2 (DTL), the processor 3 executes the interruption process in FIG. 7.

When receiving an access request from the internal bus 86, the bus interface circuit 1 sends an interrupt to the processor 3. When the interrupt from the bus interface circuit 1 is notified, the processor 3 executes the interruption process in FIG. 6.

(S1) The processor 3 analyzes data in the internal bus 86 that has been received by the bus interface circuit 1. This data includes data indicating the designated disk device, the start address and the requested transfer amount.

(S2) The processor 3 instructs the data transfer circuit 2 to select the disk device, and then terminates the process. The data transfer circuit 2 instructs the transfer path (SCSI controller) for the designated disk device to select the designated disk device. Consequently, the SCSI controller accesses the designated disk device.

When the designated disk device becomes ready to transfer data at the designated data start address, it notifies the initiation of data transfer to the SCSI controller. This notice is given to the data transfer circuit 2 via the SCSI controller. Upon reception of this notice, the data transfer circuit 2 sends an interrupt to the processor 3. When receiving the interrupt from the data transfer circuit 2, the processor 3 executes the interruption process in FIG. 7.

(S3) When receiving the interrupt from the data transfer circuit 2, the processor 3 selects a buffer area to be used in accordance with the content of the interrupt.

(S4) Then, the processor 3 sets the buffer use flag ("1") of that of the data transfer control tables 41-0 to 41-5 which is associated with the selected buffer area in the memory 4. Further, the processor 3 sets the transfer-start transfer amount (N bytes), at which transfer will start, in the transfer amount check pointer of that data transfer control table 41-0, 41-1, 41-2, 41-3, 41-4 or 41-5.

(S5) The processor 3 sets the requested transfer number for that access in the requested transfer number in the data transfer control table 41-0, 41-1, 41-2, 41-3, 41-4 or 41-5.

(S6) The processor 3 instructs the data transfer circuit 2 to transfer data between the selected buffer area and the designated magnetic disk device, and enable the data transfer. The processor 3 then terminates the process.

As a result, the data transfer circuit notifies the initiation of data transfer to the associated SCSI controller 6-0 to 6-5. Accordingly, the magnetic disk device for which the interrupt has been generated starts transferring data at the transfer rate of that device. The transferred data is stored in the buffer in the SCSI controller 6-0 to 6-5 after which it is transferred to the buffer memory 5 via the PCI bus 7 and the data transfer circuit 2.

At this time, the data transfer circuit 2 stores the data, transferred from the magnetic disk device, into the buffer area associated with that transfer path. The data transfer circuit 2 monitors the data transfer amount for each transfer path using a counter.

The data transfer process shown in FIG. 5 will now be described with reference to FIG. 8.

(S10) First, the processor 3 checks if the internal bus 86 is in use. For this purpose, the processor 3 checks if the bus use flag BUS in the memory 4 is set ("1"). The bus use flag BUS is set when a request for data transfer by the internal bus is given to the bus interface circuit (BIL) 1. When the bus use flag BUS is not set, the processor 3 proceeds to step S12.

(S11) When determining that the bus use flag BUS is set, the processor 3 checks the data transfer status of the bus interface circuit 1. When receiving the data transfer request from the processor 3, the bus interface circuit 1 gets a permission to use the internal bus 86, then automatically transfers data from the designated buffer area in the buffer memory 5. Then, the bus interface circuit 1 sets the transfer end flag when the transfer of the specified amount of data is completed.

The processor 3 analyzes this transfer end flag to determine if the bus interface circuit 1 has completed data transfer. When the data transfer by the bus interface circuit 1 is not completed, data transfer from one buffer area to the internal bus is in progress so that data from the other buffer areas cannot be transferred to the internal bus. Therefore, the processor 3 terminates this process.

When the data transfer by the bus interface circuit 1 is finished, on the other hand, data transfer from one buffer area to the internal bus is completed so that data from the other buffer areas can be transferred to the internal bus. The processor 3 therefore resets the bus use flag BUS (sets it to "0") in the memory 4.

(S12) Next, the processor 3 checks the individual data transfer control tables 41-0 to 41-5 for the respective transfer paths of the memory 4. First, the processor 3 sets the identifier i of the transfer paths to "0."

(S13) The processor 3 checks if the identifier i is "6." If the identifier i is "6," which means that processing of all the data transfer control tables is completed, the processor 3 terminates this process.

(S14) The processor 3 checks if a buffer use flag T-USE(i) in the data transfer control table with the identifier i has been set (if it is "1"). When the buffer use flag T-USE(i) is not set, the processor 3 determines that the data transfer control table is not used. That is, the processor 3 determines that the buffer area indicated by that data transfer control table is not used. Then, the processor 3 changes the identifier i to "i+1", to check the next data transfer control table and then returns to step S13.

(S15) The processor 3 checks if the transfer amount check pointer chk(i) in the data transfer control table with the identifier i has reached the requested transfer amount cnt(i) in the data transfer control table with the identifier i. When the transfer amount check pointer chk(i) has reached the requested transfer amount cnt(i), it implies that the transfer of the requested transfer amount has been completed.

Accordingly, the processor 3 resets the buffer use flag T-USE(i) (sets it to "0") in the data transfer control table with the identifier i. Then, the processor 3 changes the identifier i to "i+1" to check the next data transfer control table and then returns to step S13.

(S16) When the transfer amount check pointer chk(i) has not reached the requested transfer amount cnt(i), it implies that the transfer of the requested transfer amount has not been finished. Therefore, the processor 3 reads a transfer pointer DTL pointer indicating the number of transfers of the data transfer circuit 2. The transfer pointer DTL pointer of the data transfer circuit 2 indicates the amount of data transfer of the associated transfer path.

Then, the processor 3 determines if the transfer pointer DTL pointer has reached the transfer amount check pointer chk(i) of the data transfer control table with the identifier i. When the transfer pointer DTL pointer has not reached the transfer amount check pointer chk(i) of the data transfer control table with the identifier i, the transfer amount has not reached the transfer-start transfer amount yet. The processor 3 therefore changes the identifier i to "i+1" to check the next data transfer control table and then returns to step S13.

(S17) When determining that the transfer pointer DTL pointer has reached the transfer amount check pointer chk(i) of the data transfer control table with the identifier i, the processor 3 starts data transfer to the internal bus.

Therefore, the processor 3 changes the transfer amount check pointer chk(i) to "chk(i)+N."

(S18) Next, the processor 3 sends a transfer request to the bus interface circuit 1. At this time, the processor 3 specifies the buffer area for data transfer to the bus interface circuit 1.

Accordingly, the bus interface circuit 1 obtains a permission to use the internal bus 86, and then reads data from the designated buffer area in the buffer memory 5 via the data transfer circuit 2. Then, the bus interface circuit 1 transfers this data in the internal bus 86. The transfer rate at this time is the transfer rate of the internal bus 86.

As apparent from the above, the PCI bus 7 for transferring data at the second transfer rate faster than the transfer rate of the disk devices connects a plurality of SCSI controllers (first transfer circuits) 6-0 to 6-5 to the data transfer circuit (second transfer circuit) 2. Even when a plurality of disk devices with a slow transfer rate operate in parallel as shown in FIG. 9, therefore, data can be transferred fast to the data transfer circuit 2 by using the PCI bus 7 with a faster transfer rate in a time-divisional manner.

Further, the buffer memory 5 having buffer areas associated with the respective SCSI controllers 6-0 to 6-5 is provided so that data from each SCSI controller is stored in the associated buffer area. When the amount of data in each buffer area reaches a predetermined amount, the interface circuit transfers the data in that buffer area.

With this structure, as shown in FIG. 9, transfer operations of a plurality of disk devices are simply data transfers into the associated buffer areas, the transfer operations of a plurality of disk devices can be executed independently of operations of transferring data to the internal bus. As data transfer to the internal bus is performed when the amount of data in a buffer area of interest reaches a predetermined amount, operations of transferring data to the internal bus can be executed independently of the transfer operations of a plurality of disk devices. Even when a plurality of disk devices operate in parallel, therefore, data from the disk devices can be transferred in the proper order to the internal bus.

Since the bus use flag BUS is provided to monitor if the internal bus is used by the bus interface circuit, during data transfer from one buffer area, data transfer from the other buffer areas can be inhibited. When data transfer from one buffer area is completed, data transfer from the other buffer areas can be permitted. It is therefore possible to transfer data in the buffer areas to the internal bus in the adequate order.

Besides the above-described embodiment, this invention may be modified as follows.

(1) Although the foregoing description of the embodiment has been given of the example in which six transfer paths are formed, this invention is not limited to the type which uses six transfer paths but may be adapted to any type which uses a plurality of transfer paths.

(2) Although the disk devices have been illustrated as magnetic disk devices, optical disk devices, magneto optical disk devices or other types may be used as well.

Although one embodiment of this invention has been described herein, various modifications can be made within the scope of this invention and are not to be eliminated from the scope and spirit of this invention.

As apparent from the above, this invention has the following advantages (1) As buffer areas are provided for respective transfer paths of disk devices and the transfer paths are designed with a fast bus, a plurality of disk devices can operate in parallel.

(2) Since data in a buffer area is transferred when it is detected that the amount of the data in the buffer area has reached a predetermined amount, disk devices can operate in parallel by effectively using the speed of the internal bus.

What is claimed is:

1. A disk control apparatus, connected to a plurality of disk devices, for accessing a designated disk device in accordance with a request from a high-rank apparatus and transferring data from said disk device to said high-rank apparatus, comprising:

a channel adapter to control interface with said high-rank apparatus and to transfer data to said high-rank apparatus;

a memory to store said data;

a device adapter to access said designated disk device and to transfer data from said disk device to said memory;

a resource manager to instruct said device adapter to access said disk device in accordance with a request from said channel adapter; and an internal bus to connect said channel adapter, said memory, said device adapter and said resource manager, said device adapter including, an interface circuit to transfer data to said internal bus, a data transfer circuit to form a plurality of data transfer paths through which said plurality of disk devices transfer data in parallel, a buffer memory having buffer areas respectively provided for said data transfer paths, and a control circuit to instruct said data transfer circuit to transfer data from said designated disk device to an associated buffer area in said buffer memory in accordance with an interrupt request from said disk device, and to instruct said interface circuit to transfer data from said buffer area when an amount of the data in said buffer area reaches a predetermined amount, wherein said data transfer circuit includes:

a plurality of first transfer circuits, respectively connected to said plurality of disk devices, to exchange data with said disk devices at a first transfer rate;

a second transfer circuit to store data from said designated disk device into an associated buffer area; and a data transfer bus to connect said plurality of first transfer circuits to said second transfer circuit and to transfer data at a second transfer rate faster than said first transfer rate, said plurality of first transfer circuits using said data transfer bus in a time-divisional manner.

2. A disk control apparatus, connected to a plurality of disk devices, for accessing a designated disk device in accordance with a request from a high-rank apparatus and transferring data from said disk device to said high-rank apparatus, comprising:

a channel adapter to control interface with said high-rank apparatus and to transfer data to said high-rank apparatus;

a memory to store said data;

a device adapter to access said designated disk device and to transfer data from said disk device to said memory;

a resource manager to instruct said device adapter to access said disk device in accordance with a request from said channel adapter; and an internal bus to connect said channel adapter, said memory, said device adapter and said resource manager, said device adapter including, an interface circuit to transfer data to said internal bus, a data transfer circuit to form a plurality of data transfer paths through which said plurality of disk devices transfer data in parallel, a buffer memory having buffer areas respectively provided for said data transfer paths, and a control circuit to instruct said data transfer circuit to transfer data from said designated disk device to an associated buffer area in said buffer memory in accordance with an interrupt request from said disk device, and to instruct said interface circuit to transfer data from said buffer area when an amount of the data in said buffer area reaches a predetermined amount, wherein said control circuit includes:

a second memory to store a data transfer table to monitor data transfer of said designated disk device; and a processor to, in accordance with said interrupt request, set a data transfer table for that buffer area which is used by said designated disk device and to monitor said data transfer.

3. The disk control apparatus according to claim 2, wherein said processor sets a use flag and a transfer amount for detecting that a predetermined amount of data is stored in said buffer area, in said data transfer table.

4. The disk control apparatus according to claim 3, wherein said data transfer circuit includes:
a plurality of first transfer circuits, respectively connected to said plurality of disk devices, to exchange data with said disk devices at a first transfer rate;
a second transfer circuit to store data from said designated disk device into an associated buffer area; and
a data transfer bus to connect said plurality of first transfer circuits to said second transfer circuit and to transfer data at a second transfer rate faster than said first transfer rate,
said plurality of first transfer circuits using said data transfer bus in a time-divisional manner,
and wherein said processor compares a data transfer amount of said second transfer circuit with said transfer amount set in said data transfer table to detect if said data transfer amount of said buffer area has reached a predetermined amount.

5. The disk control apparatus according to claim 4, wherein said processor updates said transfer amount in said data transfer table when said data transfer amount of said buffer area has reached said predetermined amount.

6. A disk control apparatus, connected to a plurality of disk devices, for accessing a designated disk device in accordance with a request from a high-rank apparatus and transferring data from said disk device to said high-rank apparatus, comprising:
a channel adapter to control interface with said high-rank apparatus and to transfer data to said high-rank apparatus;
a memory to store said data;
a device adapter to access said designated disk device and to transfer data from said disk device to said memory;
a resource manager to instruct said device adapter to access said disk device in accordance with a request from said channel adapter; and
an internal bus to connect said channel adapter, said memory, said device adapter and said resource manager,
said device adapter including,
an interface circuit to transfer data to said internal bus,
a data transfer circuit to form a plurality of data transfer paths through which said plurality of disk devices transfer data in parallel,
a buffer memory having buffer areas respectively provided for said data transfer paths, and
a control circuit to instruct said data transfer circuit to transfer data from said designated disk device to an associated buffer area in said buffer memory in accordance with an interrupt request from said disk device, and to instruct said interface circuit to transfer data from said buffer area when an amount of the data in said buffer area reaches a predetermined amount,
wherein said control circuit includes:
a second memory to store a use flag indicating said internal bus is being used by said interface circuit; and
a processor to set said use flag in accordance with a transfer instruction to said interface circuit.

7. The disk control apparatus according to claim 6, wherein when said use flag is not set, said processor checks if a data transfer amount of said buffer area has reached a predetermined amount.

8. The disk control apparatus according to claim 7, wherein when said use flag is set, said processor inhibits data transfer from other buffer areas.

9. A disk controller, connected to a plurality of disk devices, for accessing a designated disk device and transferring data from said disk device to a bus including:
an interface circuit to transfer data to said bus;
a data transfer circuit to form a plurality of data transfer paths through which said plurality of disk devices transfer data in parallel,
a buffer memory having buffer areas respectively provided for said data transfer paths, and
a control circuit to instruct said data transfer circuit to transfer data from said designated disk device to an associated buffer area in said buffer memory in accordance with an interrupt request from said disk device, and to instruct said interface circuit to transfer data from said buffer area when an amount of the data in said buffer area reaches a predetermined amount,
wherein said control circuit includes:
a plurality of first transfer circuits, respectively connected to said plurality of disk devices, to exchange data with said disk devices at a first transfer rate;
a second transfer circuit to store data from said designated disk device into an associated buffer area; and
a data transfer bus to connect said plurality of first transfer circuits to said second transfer circuit and to transfer data at a second transfer rate faster than said first transfer rate,
said plurality of first transfer circuits using said data transfer bus in a time-divisional manner.

10. A disk controller, connected to a plurality of disk devices, for accessing a designated disk device and transferring data from said disk device to a bus including:
an interface circuit to transfer data to said bus;
a data transfer circuit to form a plurality of data transfer paths through which said plurality of disk devices transfer data in parallel;
a buffer memory having buffer areas respectively provided for said data transfer paths; and
a control circuit to instruct said data transfer circuit to transfer data from said designated disk device to an associated buffer area in said buffer memory in accordance with an interrupt request from said disk device, and to instruct said interface circuit to transfer data from said buffer area when an amount of the data in said buffer area reaches a predetermined amount,
wherein said control circuit includes:
a second memory to store a data transfer table to monitor data transfer of said designated disk device; and
a processor to, in accordance with said interrupt request, set a data transfer table for that buffer area which is used by said designated disk device and to monitor said data transfer.

11. The disk controller according to claim 10, wherein said processor sets a use flag and a transfer amount to detect that a predetermined amount of data is stored in said buffer area, in said data transfer table.

12. The disk controller according to claim 11, wherein said data transfer circuit includes:
a plurality of first transfer circuits, respectively connected to said plurality of disk devices, to exchange data with said disk devices at a first transfer rate;
a second transfer circuit to store data from said designated disk device into an associated buffer area; and a data transfer bus to connect said plurality of first transfer circuit to said second transfer circuit and to transfer data at a second transfer rate faster than said first transfer rate, said plurality of first transfer circuits using said data transfer bus in a time-divisional manner, and wherein said processor compares a data transfer amount of said second transfer circuit with said transfer amount set in said data transfer table to detect if said data transfer amount of said buffer area has reached a predetermined amount.

13. The disk controller according to claim 12, wherein said processor updates said transfer amount in said data transfer table when said data transfer amount of said buffer area has reached said predetermined amount.

14. A disk controller, connected to a plurality of disk devices, for accessing a designated disk device and transferring data from said disk device to a bus, including:

an interface circuit to transfer data to said bus;

a data transfer circuit to form a plurality of data transfer paths through which said plurality of disk devices transfer data in parallel;

a buffer memory having buffer areas respectively provided for said data transfer paths, and a control circuit to instruct said data transfer circuit to transfer data from said designated disk device to an associated buffer area in said buffer memory in accordance with an interrupt request from said disk device, and to instruct said interface circuit to transfer data from said buffer area when an amount of the data in said buffer area reaches a predetermined amount;

wherein said control circuit includes:

a second memory to store a use flag indicating said bus is being used by said interface circuit; and a processor to set said use flag in accordance with a transfer instruction to said interface circuit.

15. The disk controller according to claim 14, wherein when said use flag is not set, said processor checks if a data transfer amount of said buffer area has reached a predetermined amount.

16. The disk controller according to claim 17, wherein when said use flag is set, said processor inhibits data transfer from other buffer areas.

* * * * *